(12) United States Patent
Yepez et al.

(10) Patent No.: US 12,456,108 B2
(45) Date of Patent: Oct. 28, 2025

(54) DYNAMIC DISPLAY FOR TERMINAL LANE INDICATOR

(71) Applicant: NCR Voyix Corporation, Atlanta, GA (US)

(72) Inventors: Rafael Yepez, Duluth, GA (US); Terry Jendon, Dawsonville, GA (US); Nardeen Saleb, Johns Creek, GA (US)

(73) Assignee: NCR Voyix Corporation, Atlanta, GA (US)

( * ) Notice: Subject to any disclaimer, the term of this patent is extended or adjusted under 35 U.S.C. 154(b) by 326 days.

(21) Appl. No.: 17/929,479

(22) Filed: Sep. 2, 2022

(65) Prior Publication Data

US 2023/0136763 A1 May 4, 2023

Related U.S. Application Data

(60) Provisional application No. 63/240,599, filed on Sep. 3, 2021.

(51) Int. Cl.
*G06Q 20/32* (2012.01)
*G06K 7/14* (2006.01)
(Continued)

(52) U.S. Cl.
CPC ....... *G06Q 20/3224* (2013.01); *G06K 7/1413* (2013.01); *G06Q 20/047* (2020.05); *G06Q 20/18* (2013.01); *G06Q 20/208* (2013.01); *G06Q 20/3223* (2013.01); *G06Q 20/42* (2013.01); *G06Q 30/0623* (2013.01); *G06Q 30/0639* (2013.01); *G07G 1/01* (2013.01); *G09F 13/0431* (2021.05); *G09F 13/22* (2013.01); *H04N 23/56* (2023.01); *H04N 23/90* (2023.01); *G06V 20/52* (2022.01); *G06V 40/10* (2022.01)

(58) Field of Classification Search
CPC ..... G09F 13/0431; G09F 13/22; G06Q 20/18; G07G 1/01
See application file for complete search history.

(56) References Cited

U.S. PATENT DOCUMENTS 7,036,726 B1 *  5/2006  Edwards ............... G06Q 20/20
                                                       705/16
7,416,117 B1 *  8/2008  Morrison .................. A47F 9/04
                                                       235/383

(Continued)

*Primary Examiner* — Gary C Hoge
(74) *Attorney, Agent, or Firm* — Schwegman Lundberg & Woessner, P.A.

(57) ABSTRACT

A terminal indicator device is provided as a peripheral of a self-service terminal (SST). The indicator device includes two separate displays back-to-back or a single contiguous display having a display surface area of greater than 180 degrees and up to 360 degrees. The indicator device includes a host port for connecting to the SST and one or more status light ports for connecting to one or more status lights. The indicator device is affixed to an apparatus situated above the SST. The apparatus includes the one or more status light strips. The SST controls colors and/or effects of the status light strips and media played on the two displays or the contiguous display. In an embodiment, a server controls the status light strips and the media played on the two or more displays or the contiguous display via the SST or via a wireless transceiver of the indicator device.

12 Claims, 10 Drawing Sheets

(51) Int. Cl.
*G06Q 20/04* (2012.01)
*G06Q 20/18* (2012.01)
*G06Q 20/20* (2012.01)
*G06Q 20/42* (2012.01)
*G06Q 30/0601* (2023.01)
*G07G 1/01* (2006.01)
*G09F 13/04* (2006.01)
*G09F 13/22* (2006.01)
*H04N 23/56* (2023.01)
*H04N 23/90* (2023.01)
*G06V 20/52* (2022.01)
*G06V 40/10* (2022.01)

(56) References Cited

U.S. PATENT DOCUMENTS

| | | | | |
|---|---|---|---|---|
| 7,434,663 B1* | 10/2008 | Brosnan | | G06Q 20/203 |
| | | | | 186/68 |
| 2009/0192902 A1* | 7/2009 | Cox | | G07G 1/0054 |
| | | | | 705/16 |
| 2010/0191603 A1* | 7/2010 | Herwig | | G06Q 20/18 |
| | | | | 705/16 |
| 2015/0112825 A1* | 4/2015 | Konishi | | G07G 1/0018 |
| | | | | 705/16 |
| 2017/0030485 A1* | 2/2017 | Whiteside | | A47F 9/04 |
| 2017/0337539 A1* | 11/2017 | Richards | | G06T 7/0008 |
| 2018/0033257 A1* | 2/2018 | Taylor | | G08B 5/36 |
| 2018/0220813 A1* | 8/2018 | Bacallao | | A47G 25/1442 |
| 2018/0255943 A1* | 9/2018 | Bacallao | | E05C 1/002 |
| 2021/0065109 A1* | 3/2021 | Payne | | G06Q 20/209 |
| 2023/0237456 A1* | 7/2023 | Kawaguchi | | G07G 1/12 |
| | | | | 705/16 |

* cited by examiner

DYNAMIC DISPLAY FOR TERMINAL LANE INDICATOR

RELATED APPLICATIONS

This application is a non-provisional application that claims the benefit of Provisional Application No. 63/240,599 entitled "Modular, Portable, and Reconfigurable Interactive Displays, Terminals, and Peripherals with Interface and Store-Wide and Customer-Specific Automated Assistance, Managing, and Monitoring," filed on Sep. 3, 2021, the disclosure of which is incorporated in its entirety herein.

BACKGROUND

Traditional checkout lane indicators for self-service terminals (SSTs) only provide alerts on statuses of the SSTs using three color light codes. The three different light codes have to be learned and remembered by associates of a store and sometimes leads to misinterpretation. Shoppers may also read these color codes incorrectly, which can detract the shoppers from using the SSTs or cause shoppers to use SSTs that are out of service. The status messaging is also not always straight forward, has to be decoded, and can create confusion with associates and shoppers.

Retailers want to use the physical space associated with the lane indicators for purposes of enticing customers to use the SSTs. Increased usage of SSTs provides a variety of benefits to both the customers and the retailers. The retailers do not have to staff customer-assisted point-of-sale (POS) terminals for checkouts and the customers experience decreased checkout times, hence increasing customer flow through the store.

Physical space required for SSTs is also challenging for the retailers and most SSTs have a larger footprint than retailers would like. As a result, retailers would like to be able to use some of the physical space required by their SSTs for multiple purposes. Unfortunately, conventional lane indicators have limited and restricted functionality, and their existing functionality is confusing to both customers and retail associates.

SUMMARY

In various embodiments, a dynamic display terminal lane indicator device, a system for operating the dynamic display terminal lane indicator device and a method for operating the dynamic display terminal lane indicator device are presented. The dynamic display terminal lane indicator device includes two displays or one contiguous display with a display surface between 180 degrees and 360 degrees. The dynamic display terminal lane indicator device also includes at least one status light strip. The dynamic display terminal lane indicator device is attached to a status pole and interfaced to the two displays or the contiguous display and the one or more status light strips. The dynamic display terminal lane indicator device is interfaced to an SST. The SST controls the color and/or effects for the one or more light strips based on a status of the SST and the SST uses predefined rules to control the media played on the two display or the single contiguous displays. When the dynamic display terminal lane indicator device includes two displays, media played on the two displays can be synchronized or can be associated with different media such that each display plays its own unique media selection. In an embodiment, the status light strips, and the media played can be controlled by a server indirectly through the host SST or directly through wireless transceivers of the dynamic display terminal lane indicator device.

DETAILED DESCRIPTION

As discussed above, conventional lane indicator lights are limited in functionality, confusing, and occupy valuable physical space associated with SSTs in retail stores. As will be demonstrated herein and below, an SST is interfaced to a dynamic display terminal lane indicator device. The dynamic display terminal lane indicator device includes two independent displays that can be synchronized with one another or operated independently of one another. Alternatively, includes a single contiguous display that wraps around to cover a display area nearly 360 degrees. The dynamic display terminal lane indicator device further includes one or more status lights corresponding to states of its corresponding host SST. The SST can control what is being displayed on the one or more displays of the dynamic display terminal lane indicator device. In an embodiment, a server can control the one or more displays of the dynamic display terminal lane indicator device.

In an embodiment, the dynamic display terminal lane indicator device includes a single motherboard and a single interface board for the one or more displays. In an embodiment, a single port on a printed circuit board (PCB) for the SST is connected via a corresponding cable to a single port on an interface board of the dynamic display terminal lane indicator device to establish a wired connection between the SST and the dynamic display terminal lane indicator device. In an embodiment, the one or more displays are light-emitting diode (LED) displays, organic light-emitting diode (OLED) displays, and/or electronic in (E-Ink) displays. In an embodiment, the dynamic display terminal lane indicator device is connected and interfaced to its host SST via one or more wireless transceivers on the motherboard of the dynamic display terminal lane indicator device and one or more wireless transceivers of the host SST.

The dynamic display terminal lane indicator device (herein after referred to as just "indicator device") can have a variety of configurations, functions, and options. These configuration, functions, and options are now discussed with reference to FIGS. 1A-1H, 2, and 3.

Figure 1A:
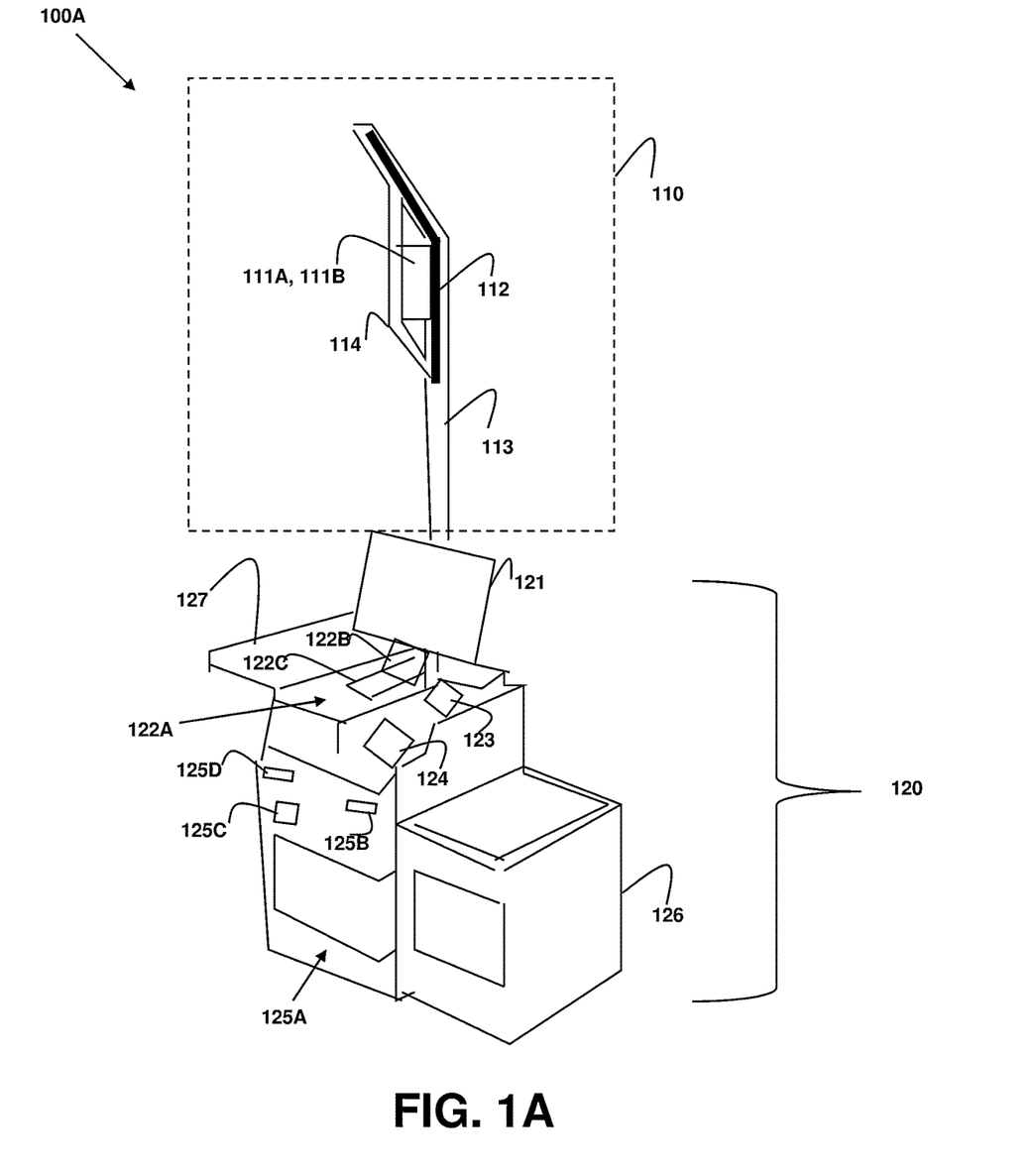
FIG. 1A is a diagram of a self-service terminal (SST) with a dynamic display terminal lane indicator device, according to an example embodiment.

FIG. 1A is a diagram 100A of an SST 200 with an indicator device 111A, according to an example embodiment. In an embodiment, the indicator device 111A includes two displays, a first display 111B representing a left-facing display and a second display 111C representing a right-facing display as shown in the middle diagram of FIG. 1B. The sizes and dimensions of the two displays 111B and 111C can be manufactured based on an apparatus 110 that holds or elevates the two displays 111B and 111C above an SST 120.

As shown in diagram 100A, the apparatus 110 that holds the two displays 111B and 111C is an SST status indicator pole 113. The two displays 111B and 111C are enclosed and held within a framed element or framed member 114 situated substantially at a top of the indicator pole 113. The interface port to the indicator device 111A can be located within the apparatus 110 at a location within the framed element 114 that is adjacent to the pole 113. One or more additional ports for one or more status indicator light strips 112 can also be situated adjacent to the interface port. In this way, the indicator device 111A can be attached to the pole 113 and interfaced directly to the SST 120 and one or more status indicator light strips 112 within the framed element 114 of pole 113. The light indicator strips 112 can be manufactured within the pole 113 or attached to an outer surface of the pole. Cabling for the light strips 112 can run inside pole 113 and a cable to the PCB port connection of the SST 120 can run inside pole 113 to the appropriate connection inside a housing of the SST 120.

It is noted that the above discussed configuration can be achieved in a variety of other manners. For example, no cable connection is needed between the indicator device 111A and the SST 120 when the connection is wireless via wireless transceivers of both the SST 120 and the indicator device 111A. In this instance, just the light strips 112 would include cabling through the pole 113. However, the light strips 112 themselves can include wireless transceivers, such that no cabling is needed at all to interface both the SST 120 and the light strips 112 to the indicator device 111A.

The SST 120 includes a variety of accessory modules and peripheral devices. For example, the SST 120, as configured in FIG. 1A, includes a touch display 121; a bioptic scanner 122A with a vertical scanner 122B and a horizontal scanner 122C; a receipt printer 123; a combined card reader and keypad 124; a media dispenser/accepter 125 with a media acceptor/dispenser chute 125B, a coin acceptor/dispenser chute 125C, and a near field communication (NFC) wireless transceiver; a bag well with an integrated bag weigh scale 126, and an accessory module side shelf 127. The indicator device 111A is also a peripheral of the SST 120 and under the control of the host device of the SST 120 via the wired or wireless connection as discussed above.

It is to be noted that similar to the indicator device 111A, the SST 120 can be configured with more peripherals and/or accessory modules or less peripherals and/or accessory modules from what is illustrated in FIG. 1A. For example, the SST 120 does not have to include the combined card reader and keypad 124 as the card reader can be integrated into a bottom of touch display 121 and the touch display 121 can provide a touch-based keypad on transaction interface screens. As another example, SST 120 can include an optional handheld scanner.

Figure 1B:
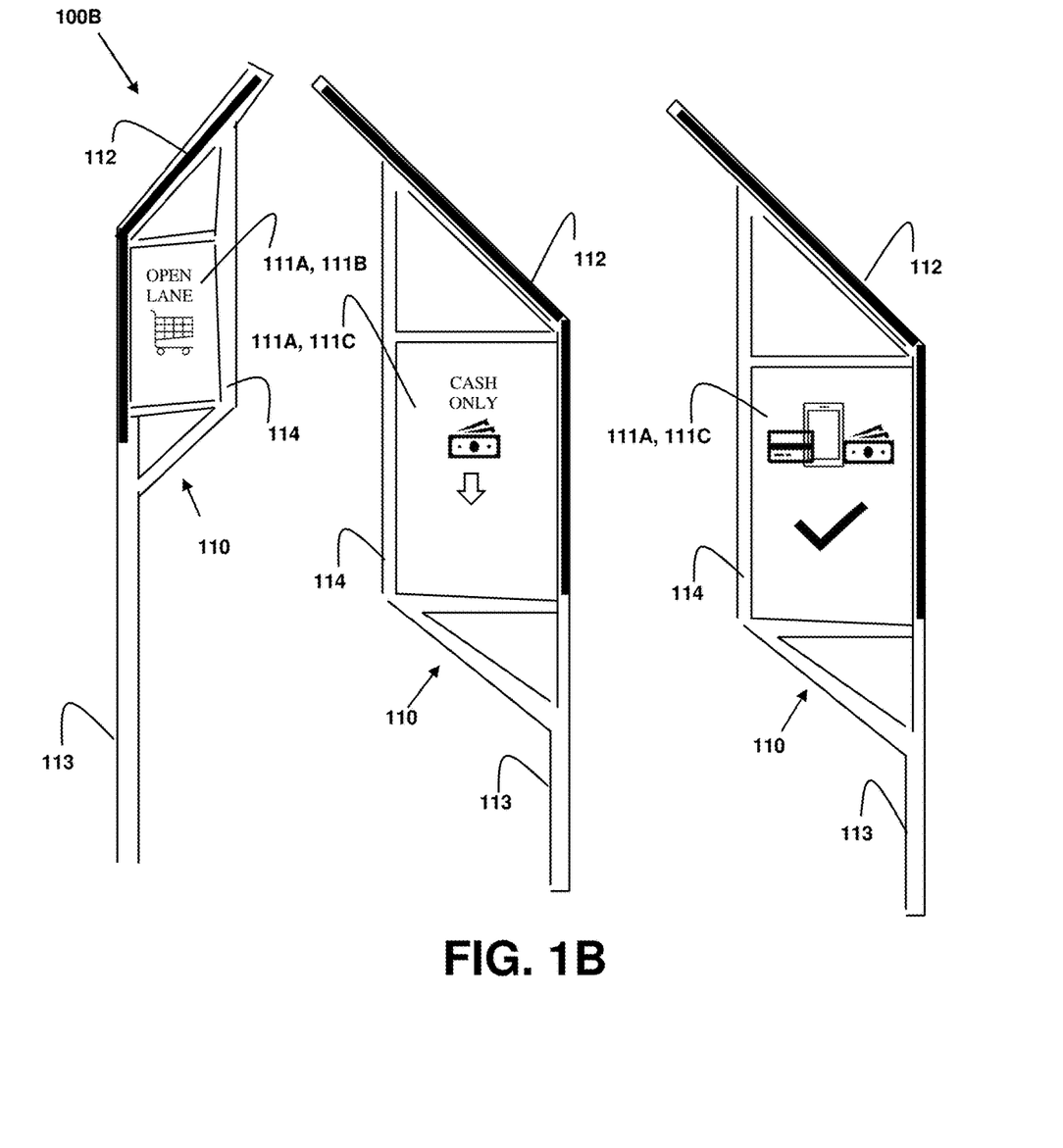
FIG. 1B are diagrams of the dynamic display terminal lane indicator device, according to an example embodiment.

FIG. 1B are diagrams 100B of the indicator device 111A, according to an example embodiment. Leftmost diagram of indicator device 111A illustrates the first or left-facing display 114 which is presenting text and graphical images indicating that the host SST 120 or lane for the SST 120 is open. The middle diagram of indicator device 111A illustrates the second or right-facing display 111C which is presenting text and graphics indicating the corresponding host SST 120 only accepts cash payments. The rightmost diagram of indicator device 111A again illustrates the second of right-facing display 111C and presents graphics indicating that the lane can accept payments by card, phone, and/or cash. Each of the views of the indicator device 111A includes an apparatus 110 similar to what was discussed above with FIG. 1A, namely indicator device 111A is enclosed within framed element 114 on a top portion of pole 113.

Figure 1C:
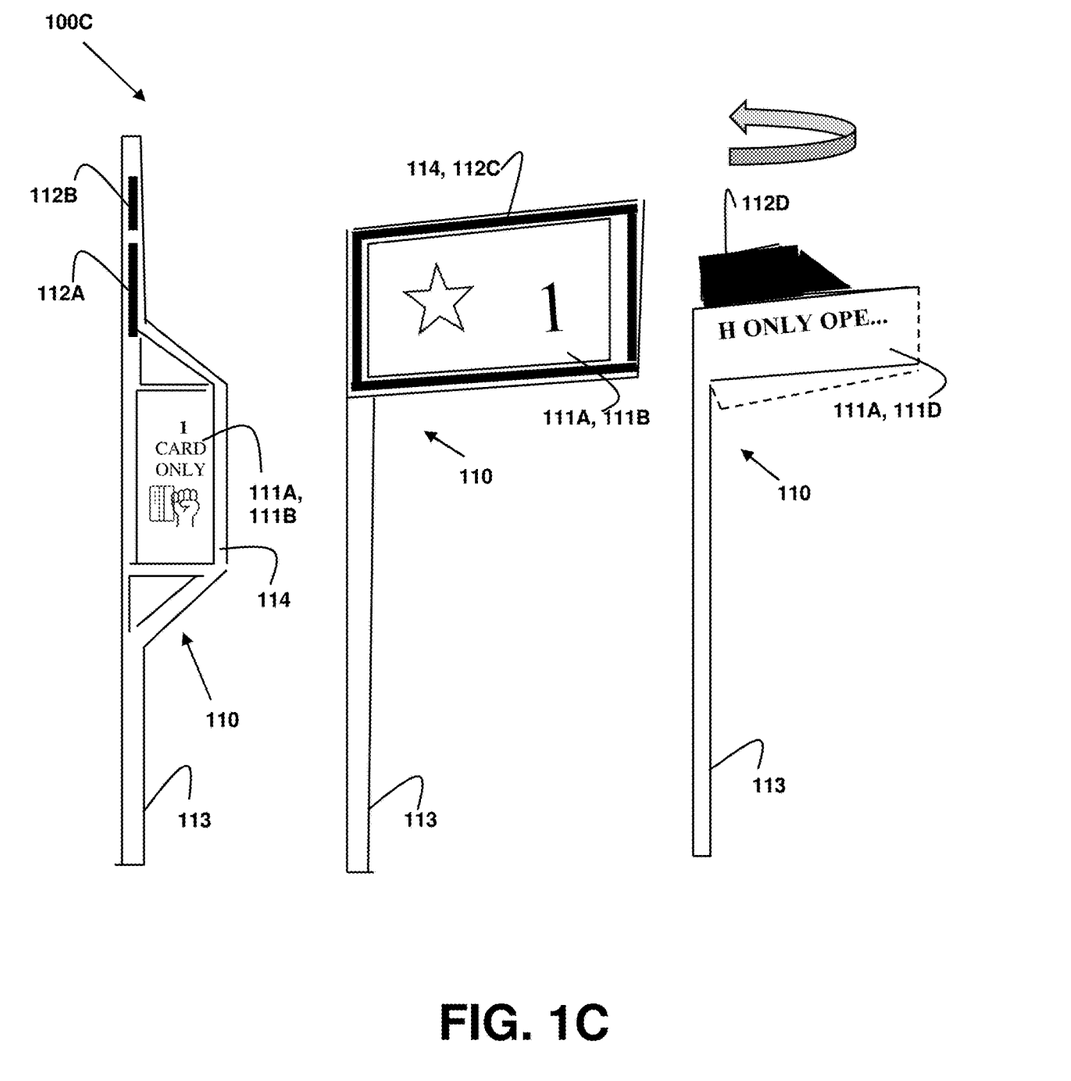
FIG. 1C are diagrams of additional dynamic display terminal lane indicator device, according to an example embodiment.

FIG. 1C are diagrams 100C of additional indicator device 111A, according to an example embodiment. Leftmost diagram illustrates an indicator device 111A showing the left-facing display 111B along with two separate and distinct light strips 112A and 112B; the apparatus to which indicator device 111A is different from what has been shown above in that the framed element 114 is situated down by an offset amount from a top portion of pole 113. The middle diagram illustrates a flag shaped configuration of the apparatus 110 and framed element 114 includes a single or four separate light sources 112C that surround all portions of framed element 114.

In the middle diagram the displayed "1" on display 111B can be used to indicate an assigned SST lane number for the corresponding host SST. Alternatively, the displayed "1" can be used to indicate that there is currently 1 customer processing a transaction on the assigned SST so as to inform any next customer that there is only a 1 person wait for the next customer to process their self-service transaction on the assigned SST. In an embodiment, the displayed "1" can represent a wait time in minutes before a next customer has access to the assigned SST.

The rightmost diagram illustrates a flag shaped configuration of apparatus 110 and a single contiguous ticker-tape display 111D as indicator device 111A. Thus, in an embodiment illustrated by the rightmost diagram the indicator device 111A is a single contiguous long display 111D that contiguously displays text and graphics in a reading order from left to right for greater than 180 degrees on two sides such that as displayed information leaves one side of display device 111D it moves to the next side of display device 111D.

Figure 1D:
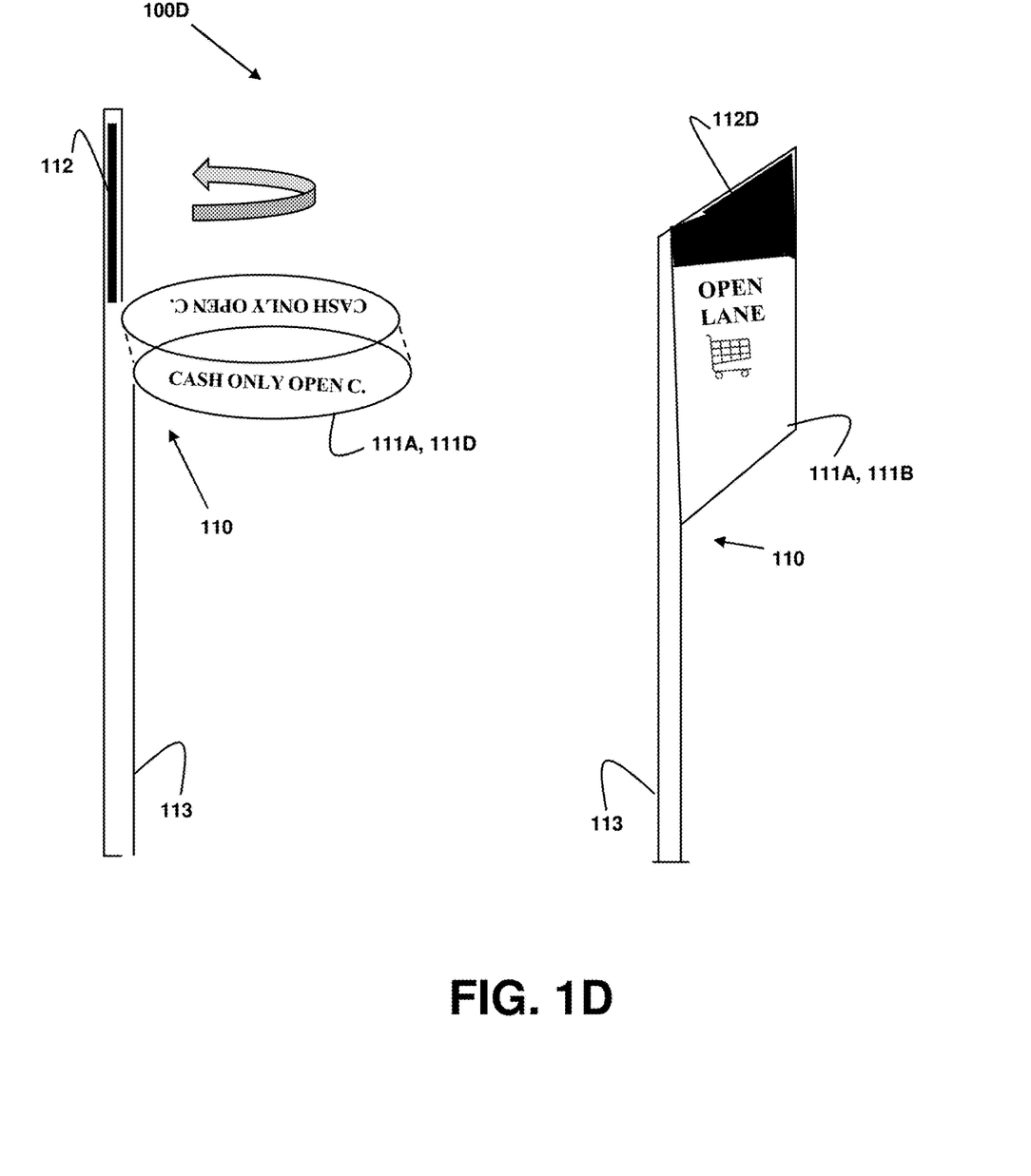
FIG. 1D are diagrams of still other dynamic display terminal lane indicator device, according to an example embodiment.

FIG. 1D are diagrams 100D of still other indicator device 111A, according to an example embodiment. Rightmost diagram illustrates a contiguous single display 111D framed in a circle shape such that framed element 114 is not visible to an onlooker. The text, images, graphics, and/or video moves from left to right for 360 degrees around the display 111D. The non-visible framed element 114 includes a top, a bottom or both a top and a bottom of the circle display 111C and is interfaced to pole 114 at a location adjacent to pole 114. There is also a single light strip 112. Leftmost diagram illustrates indicator device 111A with the left-facing display 111B visible. Again, framed element 114 is non-visible to an onlooker and a single and larger light strip 112D is situated on top of a top portion of display 111A.

Figure 1E:
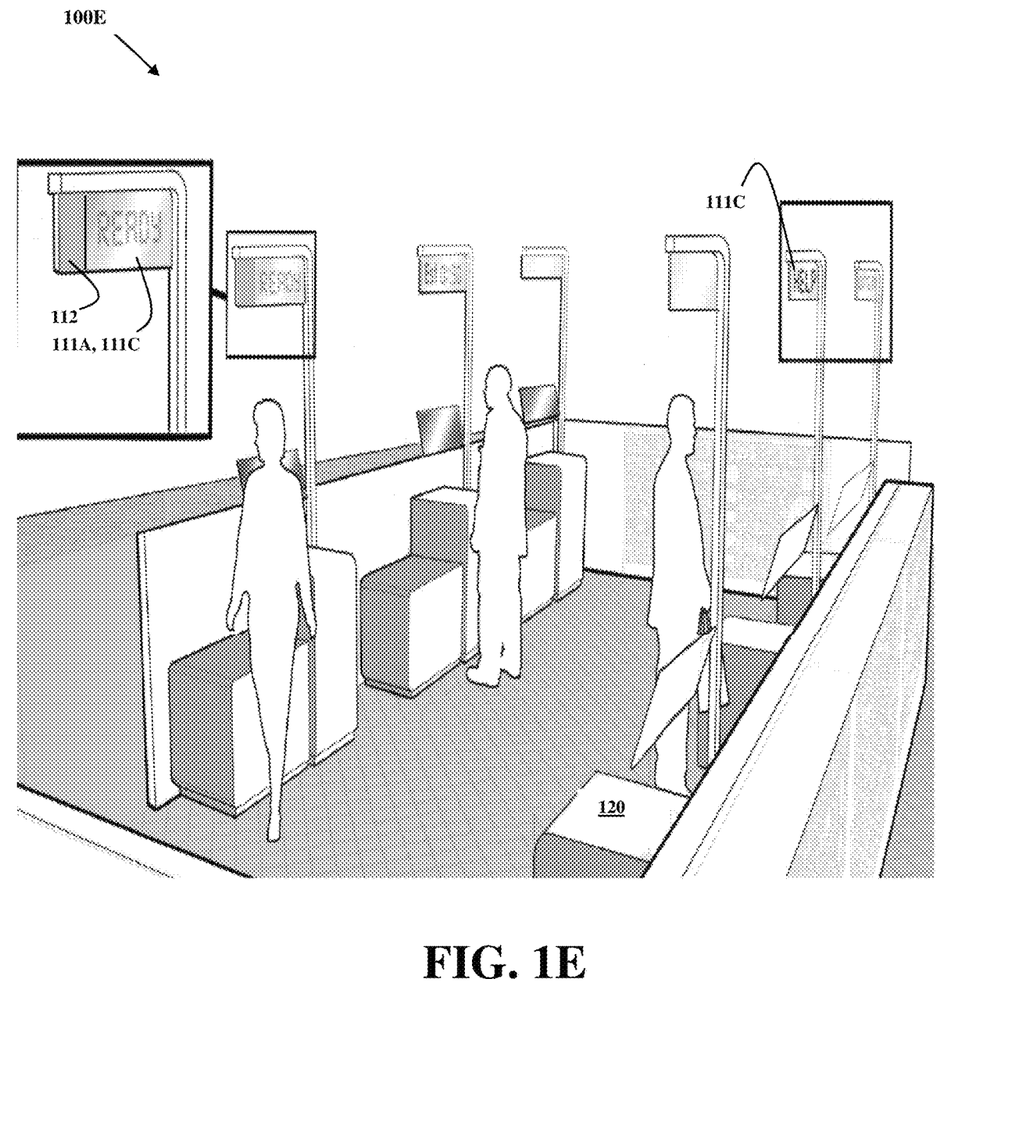
FIG. 1E is a diagram of a bank of SSTs, each SST includes its own dynamic display terminal lane indicator device, according to an example embodiment.

FIG. 1E is a diagram 100E of a bank of SSTs, 120 each SST 120 includes its own indicator device 111A, according to an example embodiment. An aisle is illustrated with customers at SSTs 120, the right-facing displays 111C are visible based on the view depicted of the aisle. The light strip 112 is adjacent to an end of the indicator device 111A so as to appear to be an end of the indicator device 111A.

Figure 1F:
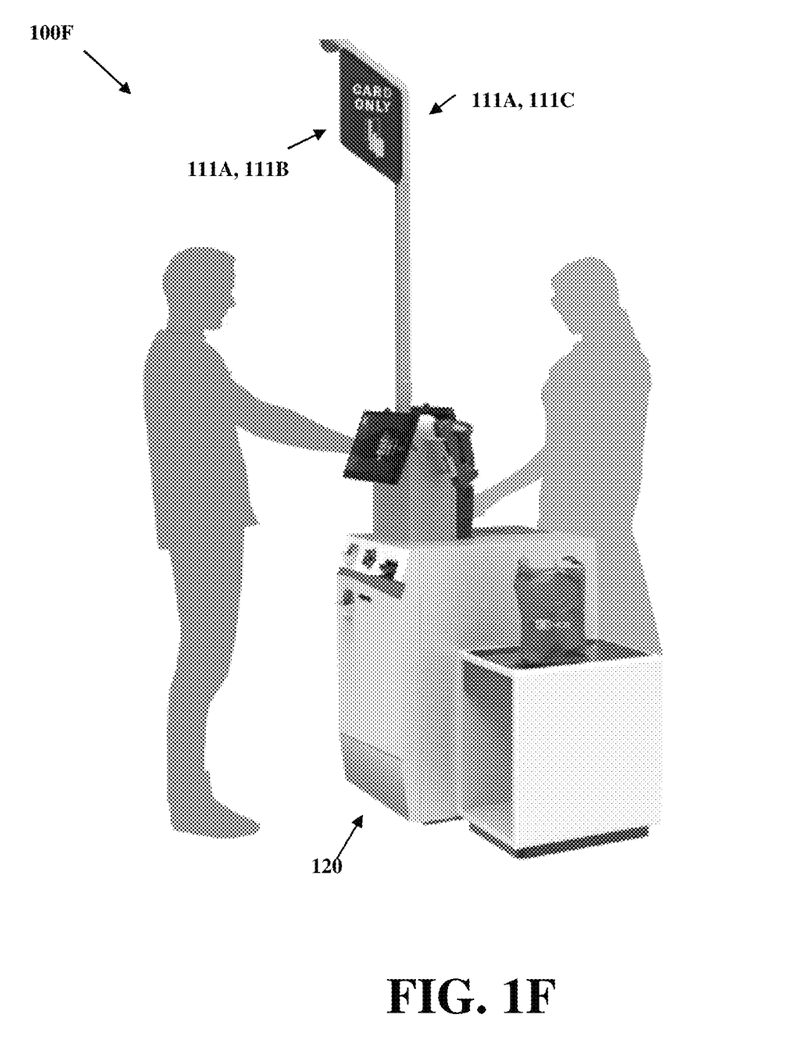
FIG. 1F is a diagram that illustrates a casher-assisted mode of operation for an SST having a dynamic display terminal lane indicator device, according to an example embodiment.

FIG. 1F is a diagram that illustrates a casher-assisted mode of operation for an SST 120 having an indicator device 111A, according to an example embodiment. An additional display can be added to the SST 120 on the side facing the cashier and the SST 120 is placed in a cashier-assisted mode of operation where a cashier shown on the righthand side of FIG. 1F can perform cashier-assisted transaction on behalf of customers shown on the lefthand side of FIG. 1F. In the cashier-assisted mode of operation the SST 120 operates as a point-of-sale (POS) terminal. The customer is facing the left-facing display 111B and the cashier is facing the right-facing display 111C. The text, graphics, images, video, and/or information presented on the left-facing display 111B to the customer can be the same as or different from the text, graphics, images, video, and/or information presented on the right-facing display 111C to the cashier.

Figure 1G:
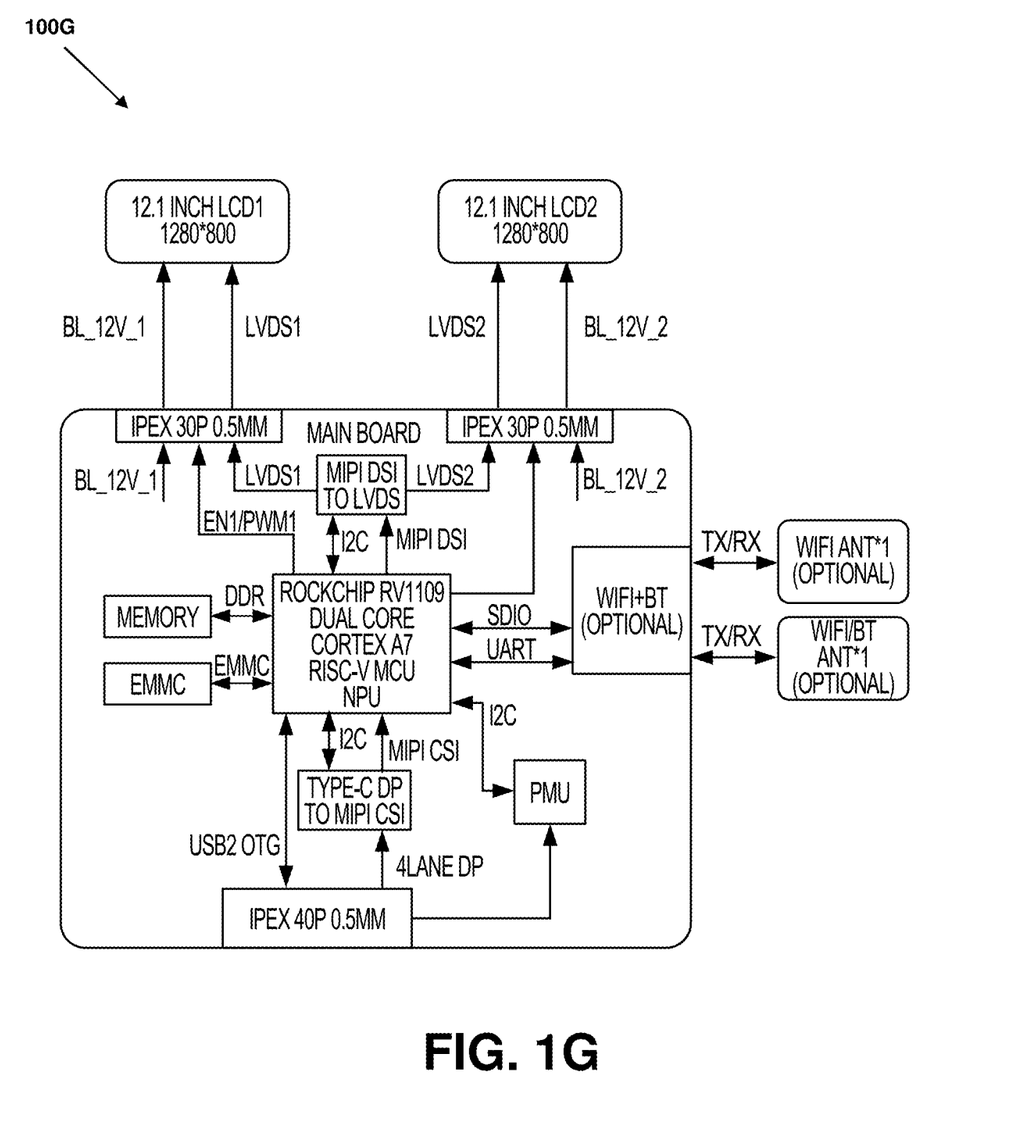
FIG. 1G is a diagram that illustrates an example architecture of a motherboard for a printed circuit board (PCB) of a dynamic display terminal lane indicator device, according to an example embodiment.

FIG. 1G is a diagram 100G that illustrates an example architecture of a motherboard for a printed circuit board (PCB) of an indicator device device 111A, according to an example embodiment. The motherboard includes two port connections to the displays 111B and 111C at the top of the motherboard. Optionally, the motherboard on the righthand side includes one or more wireless transceivers. It is noted that the layout and components illustrated on the motherboard can vary as can the options selected for memory and the processor. Thus, the architecture is presented as one embodiment as other embodiments are foreseeable.

Figure 1H:
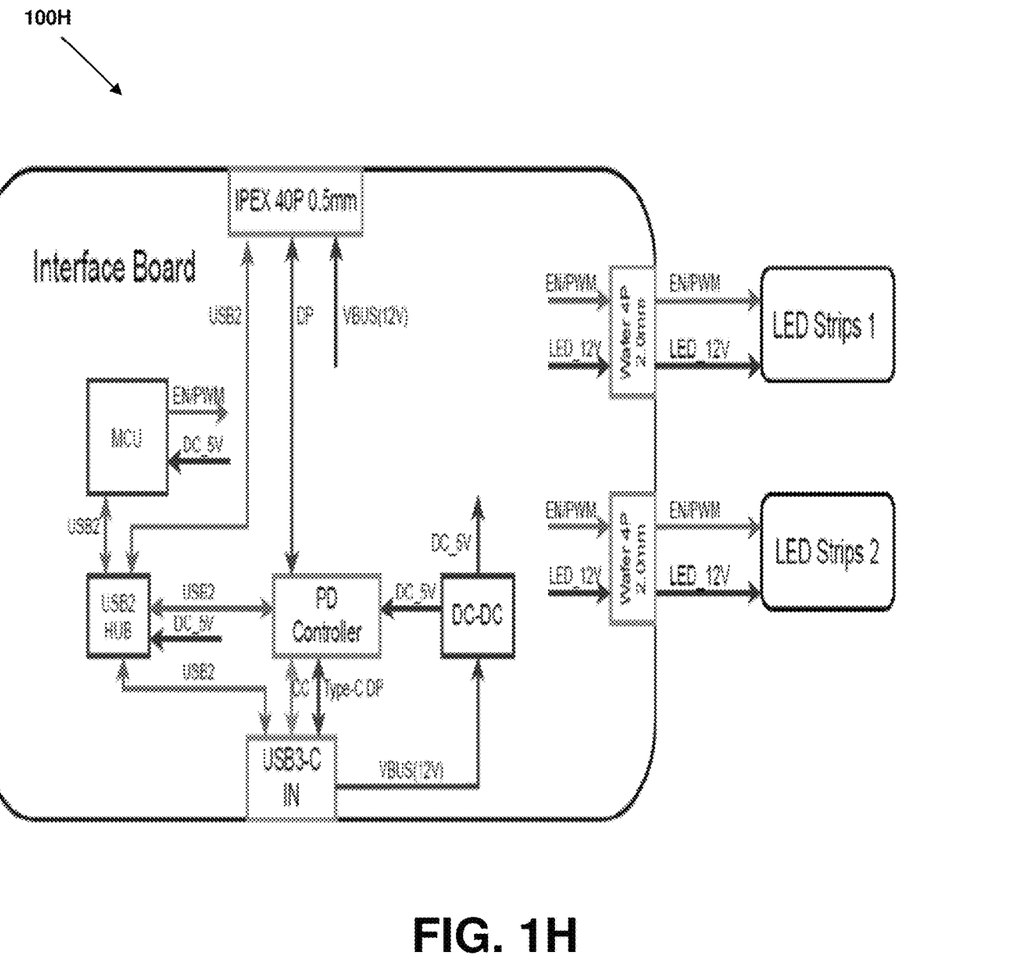
FIG. 1H is a diagram that illustrates an example architecture for an interface board of a dynamic display terminal lane indicator device, according to an example embodiment.

FIG. 1H is a diagram 100H that illustrates an example architecture for an interface board of an indicator device 111A, according to an example embodiment. The interface board illustrates on the righthand side two ports for connecting two light strips 112 and a single port at the bottom of the interface board for connection to a corresponding port on the SST 120. It is noted that additional ports can be provide for additional light strips 112 or there can just be a single light strip port. Furthermore, there can be a port for audio or other ports not specifically illustrated in FIG. 1H. Thus, the architecture is presented as one embodiment as other embodiments are foreseeable.

In an embodiment, indicator device 111A includes interface ports for a single status light strip 112 or 112A-112D or two or more status light strips 112 and 112A-112D. Each status light strip 112 and 112A-112D can be a single-colored light or support a series of different color lights. The size, dimensions, and locations of the status strip lights 112 and 112A-112D can vary and can their locations around and on pole 113, framed element 114, and indicator device 111A.

In an embodiment, indicator device 111A includes two displays situated back-to-back. In an embodiment, the indicator device 111A includes a single contiguous display whose displayable surface extends beyond 180 degrees to two sides of status pole 113 or extends 360 degrees in a circle arrangement.

In an embodiment, status light strip 112 and 112A-112D offer or convey additional information when lit, the information can be color coded to identify when an associate is requested and the display surface of the display(s) of the indicator device can show a graphic such as an icon, making clear that an associated is needed for intervention at a given SST 120. As another example, when there is a media jam or a receipt paper jam, the status light strip 1112 and 112A-112D will indicate an appropriate color while dual displays 111B and 111C of an indicator device 111A shows a graphical illustration conveying the problem with the media or paper jam.

In an embodiment, when SSTs 120 are in normal use with normal statuses, the indicator device will display information, graphics, video, and/or text letting shoppers know which SSTs 120 are "Cash Payment Only," "Card Payment Only," "Open," "Busy," and can display tentative wait times for the customers to have access to the corresponding SST 120 for self-checkout. In an embodiment, as stores seek to entice and upsell to customers, promotional material can be displayed on the indicator devices 111A, as well as seasonal messages and infinite relevant merchandising content including from sponsoring brands. Attention from shoppers is more likely to be on dynamic messaging on displays 111B, 111C, and/or 111D than on static color changes associated with conventional status indicator devices. This can help in making customer queueing less burdensome, while increasing efficiency, speed of customer checkout flow as messaging is clear as to which SST 120 to user and when. The color displays 111B, 111C, and 111D can vary in size depending on the intended use and for the desired visibility. Tests have shown positive results in using animated graphics to guide shoppers and/or using marketing material.

The displays 111B, 111C, and 111D are under the control of the SST 120, meaning that they are under software control of the SST 120. This can mean that the nature of the lead-through can change on some SSTs 120 purely for branding, e.g., colored lights 112, 112A-112D and displays 111B, 111C, or 111D are used to reflect the retailer's brand. On other colored lights 112, 112A-112D and displays 111B, 111C, and 111D can be used to provide additional guidance (e.g., this SST lane only accepts cards, this one accepts cash, along with using the light strips 112, 112A-112D to provide additional guidance as to how to use the SST lane). Each SST 120 is fully customizable with respect to how its indicator device 111A is operated in a given checkout area.

In an embodiment, a server can control one or more of the displays 111B, 111C, and/or 111D of the indicator device 111A. This can be achieved directly through a wireless connection or can be achieved through the host SST 120 of tine indicator device 111A with the host SST 120 acting as a proxy between communication from the server to the indicator device 111A.

In an embodiment, the indicator device 111A includes at least one wireless transceiver that permits another device to connect to at least one display 111B or 111C and stream a video or a set of images that plays on display 111B or 111C in a loop that repeats. The wirelessly connecting device can be a server, a different SST 120 from the host SST 120, a storage device, a video camera, and/or a mobile device. In the case of the video camera the video can be provided from the camera as a live video feed of a particular area of the store, parking lot of the store, or entrance to the store that does not loop but rather streams the live feed for playing directly on the display 111B or 111C. In an embodiment, the host SST 120 can change the video camera from an originally connected video camera to a different video camera that captures a different area of the store.

In an embodiment, the motherboard of the indicator device 111A includes at least one universal serial bus (USB) port. A video or an image slide show maintained on a USB thumb drive can be inserted into the port causing at least one display 111B or 111C to play the video or the image slide show in a loop.

Figure 2:
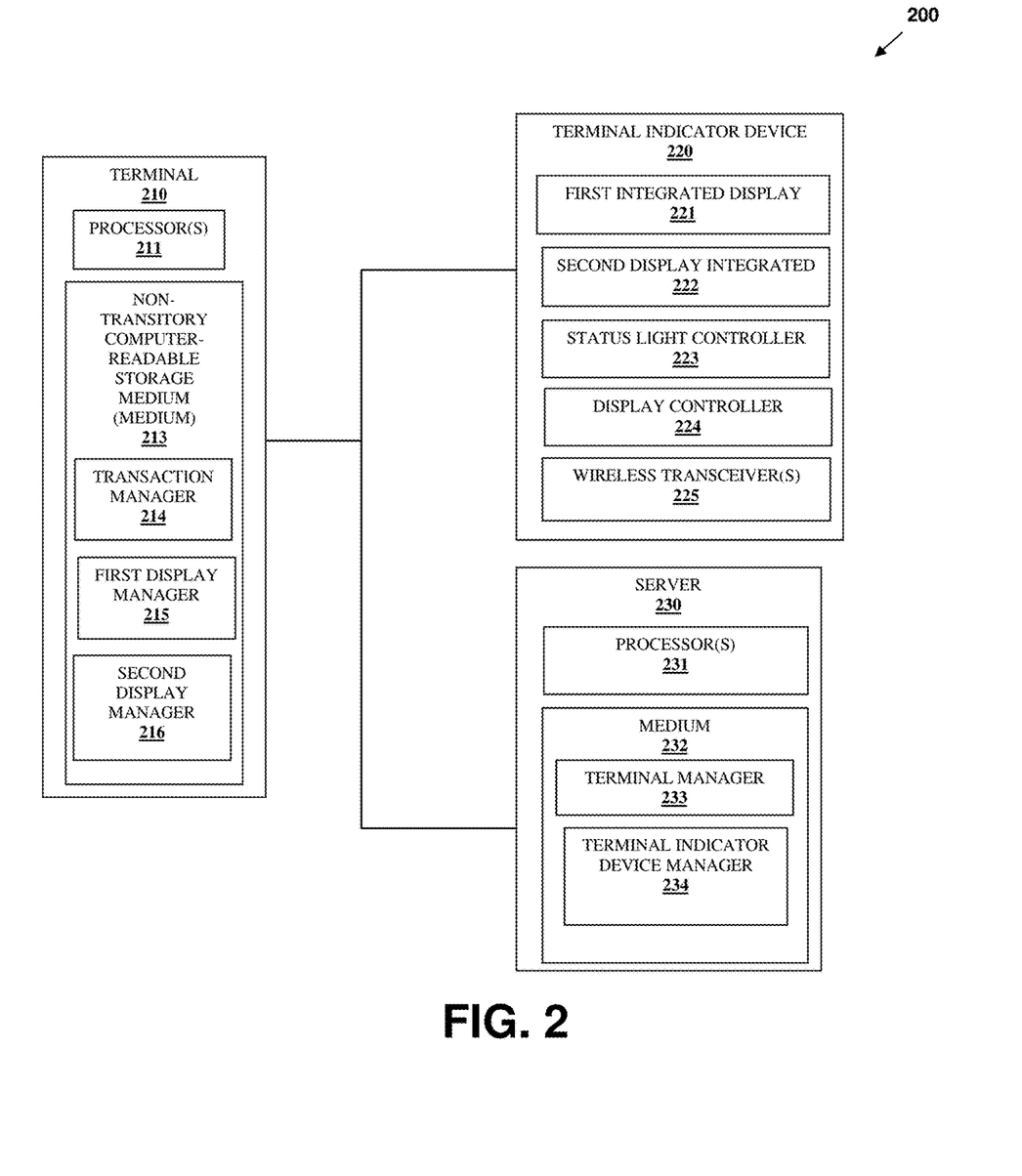
FIG. 2 is a diagram of a system for operating a dynamic display terminal lane indicator device, according to an example embodiment.

FIG. 2 is a diagram of a system 200 for operating an indicator device, according to an example embodiment. It is to be noted that the components are shown schematically in greatly simplified form, with only those components relevant to understanding of the embodiments being illustrated.

Furthermore, the various components (that are identified in FIG. 2) are illustrated and the arrangement of the components is presented for purposes of illustration only. It is to be noted that other arrangements with more or fewer components are possible without departing from the teachings of operating an indicator device, presented herein and below.

System 200 includes a terminal 210, a terminal indicator device 220 (herein referred to as "indicator device 220," and an optional server 230. Terminal 210 includes one or more processors 211 and a non-transitory computer-readable storage medium (hereinafter just "medium") 212, which includes executable instructions for a transaction manager 213 a first display manager 215, and optionally a second display manager 216. The instructions when provided to processor 211 cause processor 211 to perform the operations discussed herein for 214-216.

Indicator device 220 includes a first integrated display 221, optionally a second integrated display 222, a status light controller 223, a display controller 224, and optionally one or more wireless transceivers. Optional server 230 includes at least one processor 231 and a medium 232, which includes instructions for a terminal manager 233 and a terminal indicator device manager 234. The instructions when provided to processor 231 cause processor 231 to perform operations discussed herein for 233 and 234.

During operation of terminal 210, the terminal can be idle and not performing transaction because it is offline or has not customers performing any transactions at the moment. The terminal 210 can also be actively engaged in a transaction with a customer. Transaction manager 214 reports statuses of the terminal 210 to first display manager 215 and/or second display manager 216. The statuses can include, actively processing a self-service transaction, actively processing a cashier-assisted transaction while in a cashier-assisted mode of operation, idle but available, an attendant requested for an active transaction, a malfunction was detected such as a media or paper jam, unable to process a card payment for an activate transaction, offline and unavailable, etc.

Display manager 215 and/or display manager 216 identify the status of a given terminal 210 and uses predefined rules to resolve what is to be displayed on a two-display indicator device 220 or a single greater than 180-degree display indicator device 220. The rules include colors for each of the available status light strips 112 or 112A-112D, text, graphics, images, and/or videos to convey the information associated with the corresponding status. It can also be that the status is reflected via the light strip colors and via the presentation on one display 111B or 111C of the indicator device 220 while the second display 111C includes text, graphics, images, and/or video completely unrelated to the existing status, such as promotional information, fun facts, historical information of the store, item information for a promoted item, advertisements, etc. It can also be that a two-display indicator device 220 is synchronized with one another such that what is displayed on display 111B is simultaneously displayed on display 111C.

Display managers 215 and/or 216 can receive the rules that determine the colors of the status light strips 112, 112A-112D through terminal manager 233. Terminal manager 233 can also send updates to the rules to managers 215 and/or 216.

To control the color and effects of the status light strips 112, 112A-112D display manager(s) 215 and/or 216 send an instruction to status light controller 223. This causes terminal indicator device 220 to send signals to each of the one or more status light strips 112, 112A-112D to cause the color changes and/or effects, such as blinking, strobing, blinking at predefined rates, etc.

To control the graphics, text, images, and/or video on the one or more displays of indicator device 220, managers 215 and/or 216 stream or provide a file to display controller 224 to play or present the stream of media or the media file. With a two-display indicator device 220, the stream or file is identified with a first display identifier, a second display identifier, or both a first display identifier and a second display identifiers when the two displays are to be synchronized with the same media stream or media file. Controller 224 plays the media stream or the media file on a single display or on both displays based on the provided display identifiers. In an embodiment, first display manager 215 managers media played on the first integrated display 221 through controller 225 and manager 216 independently and separately managed media played on second integrated display 222 through controller 225.

In an embodiment, and perhaps when a given terminal is in an idle state, terminal indicator device manager 234 of server 230 can stream media or send media files directly to controller 224. This can be done through managers 215 and/or 216 acting as a proxy or can be done through optional wireless transceivers 225 of indicator device 220. Again, a two-display indicator device 220 can receive same media to play on both displays 221 and 222 or receive different media that is to be played separately each of the displays 221 and 222. In an embodiment, the terminal indicator device manager 234 can also change the color of the light strips 112, 112A-112D using managers 216 as a proxy and/or using wireless transceivers 225 to communicate the color and effects desired to status light controller 223.

In an embodiment, terminal 210 operates in a self-service mode of operation during which transaction manager 214 processes self-service checkout transactions for customers. The terminal 210 can switch to a cashier-assisted mode of operation during which a cashier performs cashier-assisted transactions for customers using transaction manager 214. This was illustrated in FIG. 1F above.

In an embodiment, indicator device 220 includes a single PCB motherboard with one, two, or more light strip ports for controlling the status light strips 112, 112A-112D. Two light strip ports where shown in the motherboard architecture of FIG. 1G. In an embodiment, indicator device 220 includes a single interface board that includes a single interface port to connect with a host SST 120. This was shown in the interface board architecture of FIG. 1H.

Figure 3:
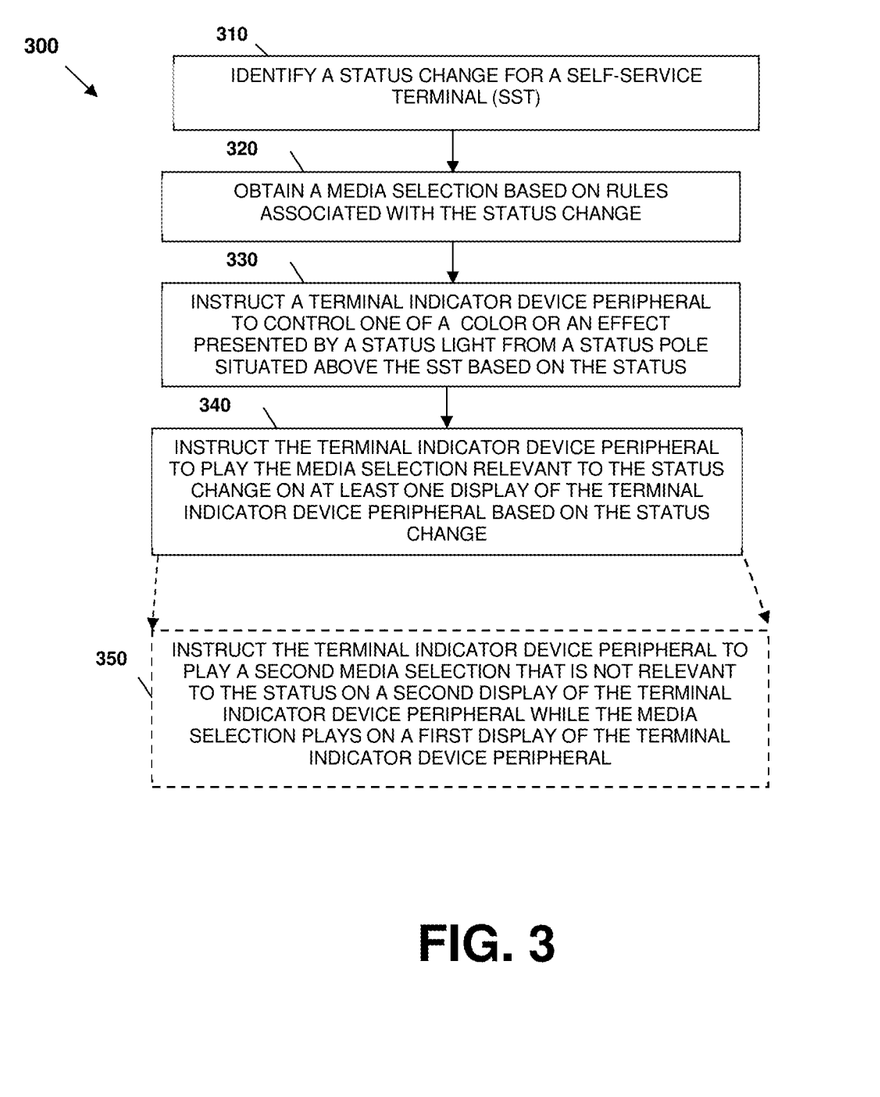
FIG. 3 is a diagram of a method for operating the dynamic display terminal lane indicator device, according to an example embodiment.

FIG. 3 is a diagram of a method 300 for operating the dynamic display terminal lane indicator device, according to an example embodiment. The software module(s) that implements the method 300 is referred to as an "SST indicator device manager." The SST indicator device manager is implemented as executable instructions programmed and residing within memory and/or a non-transitory computer-readable (processor-readable) storage medium and executed by one or more processors of a host device. The processor(s) of the device that executes the SST indicator device manager are specifically configured and programmed to process the SST indicator device manager. The SST indicator device manager has access to one or more network connections during its processing. The network connections can be wired, wireless, or a combination of wired and wireless.

In an embodiment, the device that executes the SST indicator device manager is SST 120 or terminal 210. In an embodiment, the SST indicator device manager is one or more of display manager 215 and/or display manager 216.

At 310, the SST indicator device manager identifies a status change for an SST 120 or 210. The status can be any of the above-referenced terminal statuses. At 320, the SST indicator device manager obtains a media selection based on rules associated with the status change. That is, the SST indicator device manager maintains a set of rules corresponding to light colors and/or light effects for status light strips 112 and/or 112A-112D. The rules also identify media selections that include text, graphics, images, animation, and video associated with each status.

At 330, the SST indicator device manager instructs a terminal indicator device peripheral 111A and/or 220 to control one of a color or an effect presented by a status light 112 and/or 112A-112D from a status pole 113 situated above the SST 120 and/or 210 based on the status. The terminal indicator device peripheral 111A and/or 220 attached to the status pole 113 in any of the manners discussed above with FIGS. 1A-1F.

At 340, the SST indicator device manager instructs the terminal indicator device peripheral 111A and/or 220 to play the media selection relevant to the status change on at least one display 111B and/or 111C of the terminal indicator device peripheral 111A and/or 220 based on the status change.

In an embodiment, at 340, the SST indicator device manager instructs the terminal indicator device peripheral 111A and/or 210 to play a second media selection that is not relevant to the status on a second display 111B of the terminal indicator device peripheral 111A and/or 220 while the media selection of 330 plays on a first display 111C of the terminal indicator device peripheral 111A and/or 220. This illustrates that the two displays 111B and 111C of indicator device 111A and/or 220 can be separately and independently controlled and can play different media selections on each display 111B and 111C.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner. The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A terminal display indicator device, comprising:
   at least one display;
   a set of lights of a status pole;
   a host port to connect the terminal display indicator device to a host self-service terminal (SST) as a peripheral of the host SST;
   at least one light source port;
   wherein the terminal display indicator device is adapted to be affixed to the status pole that is positioned above the host SST and connect though the host port to the SST,
   wherein the terminal display indicator device is adapted to connect the at least one light source port to a cable or a corresponding port associated with the set of lights through the status pole,
   wherein the terminal display indicator device is adapted to provide control of media played on the at least one display to the host SST when connected to the SST,
   wherein the terminal display indicator device is adapted to provided control over one of colors or effects provided through the set of lights to the host SST when connected to the host SST and connected to the set of lights.

2. The terminal display indicator device of claim 1, wherein the at least one display comprises two displays that are oriented back-to-back of each other while the terminal display indicator device is affixed to the status pole.

3. The terminal display indicator device of claim 2, wherein the two displays play a same media selection provided by the host SST on both of the two displays in synchronization.

4. The terminal display indicator device of claim 2, wherein the two displays play different media selections from one another, each different media selection provided by the host SST.

5. The terminal display indicator device of claim 1, wherein the at least one display comprises a single contiguous display having a display surface greater than 180 degrees and up to 360 degrees.

6. The terminal display indicator device of claim 5, wherein the single contiguous display when playing media provided by the host SST plays the media from left to right as a ticker tape display where the media wraps around to different sides of the single contiguous display for viewing and repeats when reaching an origination point on the single contiguous display.

7. The terminal display indicator device of claim 1, wherein the set of lights comprise multiple banks of lights, each bank of lights separately controlled by the host SST.

8. The terminal display indicator device of claim 1, wherein the terminal display indicator device is attached on a top portion of the status pole and connected to an interface port of the terminal display indicator device via the cable to the corresponding port with the cable extending inside of the status pole.

9. The terminal display indicator device of claim 8, wherein terminal display indicator device is affixed into a framed element situated at the top portion of the status pole.

10. The terminal display indicator device of claim 9, wherein the set of lights is integrated into the framed element that surrounds the at least one display.

11. The terminal display indicator device of claim 9, wherein the set of lights is integrated into the framed element on at least one side of but less than 4 sides of the framed element that surrounds the at least one display.

12. The terminal display indicator device of claim 1 further comprising, at lease one wireless transceiver adapted to receive media to play on the at least one display from a device other than the host SST.

* * * * *